US012700324B2

(12) United States Patent
Syed

(10) Patent No.: US 12,700,324 B2
(45) Date of Patent: Aug. 4, 2026

(54) SYSTEM AND METHOD FOR MONITORING AIRCRAFT MOVEMENTS WHILE AGROUND

(71) Applicant: THE BOEING COMPANY, Arlington, VA (US)

(72) Inventor: Mohammed Ahmed Syed, Redmond, WA (US)

(73) Assignee: The Boeing Company, Arlington, VA (US)

( * ) Notice: Subject to any disclaimer, the term of this patent is extended or adjusted under 35 U.S.C. 154(b) by 92 days.

(21) Appl. No.: 18/651,769

(22) Filed: May 1, 2024

(65) Prior Publication Data

US 2025/0342770 A1     Nov. 6, 2025

(51) Int. Cl.
| | |
|---|---|
| *G08G 5/80* | (2025.01) |
| *G06V 10/82* | (2022.01) |
| *G06V 20/52* | (2022.01) |
| *G06V 20/64* | (2022.01) |
| *G08G 5/21* | (2025.01) |

(52) U.S. Cl.
CPC .............. *G08G 5/80* (2025.01); *G06V 10/82* (2022.01); *G06V 20/52* (2022.01); *G06V 20/64* (2022.01); *G08G 5/21* (2025.01)

(58) Field of Classification Search
CPC .. G08G 5/80; G08G 5/21; G08G 5/22; G08G 5/51; G08G 5/727; G06V 10/82; G06V 20/52; G06V 20/64; G06V 20/54
See application file for complete search history.

(56) References Cited

U.S. PATENT DOCUMENTS

| | | | | |
|---|---|---|---|---|
| 4,940,986 A | * | 7/1990 | Huguenin ................. | G01S 1/68 342/410 |
| 2012/0075461 A1 | * | 3/2012 | Yu ........................... | G01C 21/10 348/E7.085 |
| 2013/0000539 A1 | * | 1/2013 | Wolff ...................... | B64F 1/025 244/110 E |
| 2013/0050486 A1 | * | 2/2013 | Omer ...................... | H04N 23/60 348/E7.085 |
| 2015/0206439 A1 | * | 7/2015 | Marsden ................ | B64D 47/02 701/301 |
| 2016/0039534 A1 | * | 2/2016 | Agrawal ................ | B64D 47/08 348/144 |

* cited by examiner

*Primary Examiner* — Behrang Badii
(74) *Attorney, Agent, or Firm* — Joseph M. Butscher; Carroll, Hoette & Butscher, LLC

(57)     ABSTRACT

A system and a method for monitoring one or more ground paths include an imaging device configured to acquire one or more images of the one or more ground paths. A control unit is in communication with the imaging device. The control unit is configured to receive the one or more images from the imaging device, detect one or more objects within the one or more images, track motion of the one or more objects, and output an alert signal to an aircraft in response to the one or more objects moving in relation to the aircraft.

21 Claims, 5 Drawing Sheets

SYSTEM AND METHOD FOR MONITORING AIRCRAFT MOVEMENTS WHILE AGROUND

FIELD OF THE DISCLOSURE

Examples of the present disclosure generally relate to systems and methods for monitoring moving objects in relation to ground paths, such as at airports, airfields, airstrips, vertiports, or other areas where aircraft are in motion while aground.

BACKGROUND OF THE DISCLOSURE

Aircraft are used to transport passengers and cargo between various locations. Numerous aircraft depart from and arrive at a typical airport every day.

During the time when an aircraft is aground but moving, including in preparation for takeoff or following landing, or otherwise, other aircraft may be in the process of taking off and/or landing, or likewise aground and moving. While aground as such, pilots of aircraft take care to be visually aware of the position of their aircraft with respect to other aircraft and/or ground vehicles in the vicinity, and air traffic controllers monitor air traffic, and contact pilots of aircraft regarding other aircraft. At large airports, these measures, plus, in some instances, additional infrastructure, generally are effective to prevent an aircraft, while aground, from colliding with another aircraft or ground vehicle.

However, certain smaller airports might not have extensive air traffic control operations that can alert pilots of various aircraft and objects that may be proximate to the aircraft. Moreover, such smaller airports (for example, regional or rural airports, airstrips, vertiports, austere landing environments, and the like) might not have the infrastructure and/or sufficient resources for supporting more technically sophisticated monitoring operations as are generally present at larger airport, leaving collision avoidance largely up to the pilot(s), which is not ideal.

SUMMARY OF THE DISCLOSURE

A need exists for an efficient and effective system and method for monitoring ground paths, such as runways, at airports, in particular smaller airports, airstrips, austere landing areas, and vertiports. Further, a need exists for a cost-effective and simplified system and method for monitoring ground paths.

With those needs in mind, certain examples of the present disclosure provide a system for monitoring one or more ground paths, such as runway(s), taxiway(s), airstrip(s), apron(s), parking area(s) at gate(s), and/or the like, at an airport, an airstrip, a vertiport, an austere landing area, seaplane base, waterdome, or the like. The system includes an imaging device configured to acquire one or more images of the one or more ground paths, including final approach paths within a field of view. A control unit is in communication with the imaging device. The control unit is configured to receive the one or more images from the imaging device, detect one or more objects within the one or more images, track motion of the one or more objects within the one or more images, and output an alert signal to one or more vehicles (such as an aircraft on the ground, an aircraft during takeoff or landing, land-based support vehicles, etc.) in response to the one or more objects moving in relation to the one or more vehicles. In at least one example, the one or more images of the one or more ground paths include at least a portion of a final approach path for an aircraft In at least one example, the control unit is configured to use computer vision to detect the one or more objects, and track the motion of the one or more objects. In at least one example, the control unit does not use deep learning, machine learning, or artificial intelligence.

The one or more objects can include those which are intended to be in the vicinity of the aircraft while it moves aground (for example, one or more of another aircraft, a land-based support vehicle, workers, or passengers), and/or those which are not meant to be in the vicinity (for example, animals, other wildlife, interloping humans, etc.), but which have been able to access the vicinity due to lack of sufficient barriers to prevent accessibility of the areas where the aircraft moves while it is aground.

In at least one example, the imaging device includes one or more video cameras. The one or more images can be one or more video images.

In at least one example, the control unit is configured to output the alert signal to a user interface of the aircraft. The alert signal can be configured to be one or more of shown on the display of the user interface, broadcast as an audio message, or generated as a tactile response.

In at least one example, a housing contains the imaging device and the control unit. The housing is configured to be disposed on or proximate to the one or more ground paths. As an example, the housing is sized and shaped as a runway edge lighting device.

In at least one example, the control unit is further configured to insert one or more boundaries around the one or more objects within the one or more images.

In at least one example, the control unit is further configured to highlight a distance between the aircraft and the one or more objects within the one or more images.

Certain examples of the present disclosure provide a method for a system for monitoring one or more ground paths. The method includes receiving, by the control unit, the one or more images from the imaging device; detecting, by the control unit, the one or more objects within the one or more images; tracking, by the control unit, the motion of the one or more objects within the one or more images; and outputting, by the control unit, the alert signal to the aircraft in response to the one or more objects moving in relation to the aircraft.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide ground path safety augmentation and monitoring systems and methods. The systems and methods are configured to localize objects in motion in real-time, track motion, predict trajectory, and highlight a path between various moving objects in relation to a ground path and proximity thereof, including final approach paths within a field of view. In at least one example, the systems and methods include a control unit communicatively coupled to an imaging device disposed on a ground path or at an edge thereof. The system can be contained within a housing that meets regulatory requirements to capture frames within a field of view, which are processed by the control unit to localize objects. Objects in motion, including, but not limited to, those which are intended to be in the vicinity of the aircraft while it moves aground (for example, one or more of another aircraft (whether on the ground, during takeoff, or during a final approach), a land-based support vehicle, workers, or passengers), and/or those which are not meant to be in the vicinity (for example, animals, other wildlife, interloping humans, etc.), but which have been able to access the vicinity due to lack of sufficient barriers to prevent accessibility of the areas where the aircraft moves while it is aground. Such objects are then tracked by the control unit, and paths between various moving objects can be highlighted. The control unit uses computer vision techniques without deep learning, thereby reducing computational complexity, cost, and/or power. In this manner, the systems and methods provide effective, efficient, and low cost monitoring of ground paths.

Figure 1:
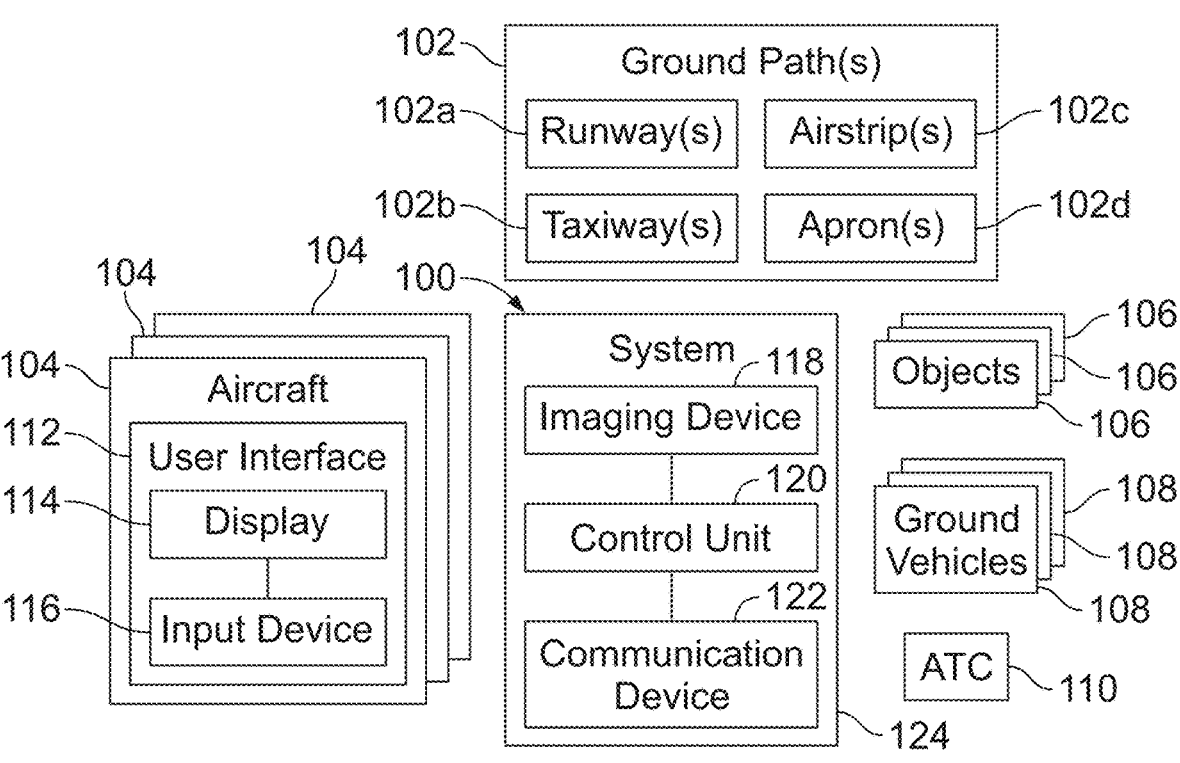
FIG. 1 illustrates a block diagram of a system, according to an example of the present disclosure.

FIG. 1 illustrates a block diagram of a system 100, according to an example of the present disclosure. The system 100 is configured to monitor one or more ground paths 102. Non-limiting examples of the ground paths 102 include runway(s) 102_a_, taxiway(s) 102_b_, airstrip(s) 102_c_, apron(s) 102_d_, landing field(s) or area(s), and/or the like, including, although not depicted and by way of further nonlimiting example, vertiport(s). Various aircraft 104, such as commercial jets, fixed wing airplanes, smaller planes having propellers, rotorcraft such as helicopters, unmanned aerial vehicles, vertical take-off and landing (VTOL) aircraft, seaplanes, and/or the like are in the vicinity of the ground path(s) 102. For example, the aircraft 104 can taxi, take off, and land in relation to the ground path 102, such as a runway 102_a_. Further, various objects 106 and ground vehicles 108 may be in the vicinity of the ground path(s) 102. The objects 106 can include stationary objects, such as buildings, trees, lighting systems, and the like, as well as moving objects, such as wildlife (for example, birds, deer, etc.). The ground vehicles 108 can include various types of vehicles at an airport, such as baggage handling vehicles, refueling tanks, de-icing equipment vehicles, and the like. Although not depicted, it is also intended, or within the realm of possibility, for individuals (for example, workers such as baggage handlers, flag persons, mechanics, as well as passengers) to be in the vicinity.

The airfield can also include air traffic control 110, such as at a central location. Optionally, the airfield might not include air traffic control 110. In at least one non-limiting example, the airfield can be a small airport, such as a regional or rural airport, an airstrip, a vertiport, an austere landing environment, or the like. As another non-limiting example, the airfield can be a large national or international airport. As another non-limiting example, the airfield can be an aerodrome or, in instances where the aircraft is a seaplane or other aircraft meant to take off and/or land on or near a body of water such as an ocean, a sea, a lake, a river, a seaplane base or a waterplane base (e.g., a waterdome).

One or more of aircraft 104 can include a user interface 112, which includes a display 114 in communication with an input device 116. Additionally, or optionally, the air traffic control 110 can include a user interface 112. The display 114 can be a monitor, screen, television, touchscreen, and/or the like. The input device 116 can include a keyboard, mouse, stylus, touchscreen interface (that is, the input device 116 can be integral with the display 114), and/or the like. The user interface 112 can be within a flight deck or cockpit of the aircraft 104. For example, the user interface 112 can be part of a flight computer. As another example, the user interface 112 can be part of a handheld device (such as a smart phone or smart tablet), a portable computer, a computer workstation, and/or the like within the aircraft 104. In at least one example, the control unit 120 and the user interface 112 are part of a common computing device. As another example, the user interface 112 can be separate and distinct from the aircraft 104, such as if the aircraft 104 is an unmanned aerial vehicle being operated from a remote location. Optionally, the aircraft 104 might not include a user interface.

The system 100 includes an imaging device 118 in communication with a control unit 120, such as through one or more wired or wireless connections. The control unit 120 is also in communication with a communication device 122, such as through one or more wired or wireless connections. The system 100 includes a housing 124, which can contain the imaging device 118, the control unit 120, and the communication device 122.

In at least one example, the imaging device 118 is or otherwise includes one or more cameras configured to acquire one or more images (such as video images) of the ground path(s) 102. For example, the imaging device 118 is a video camera configured to acquire real-time digital video images of the ground path(s) 102. As another example, the imaging device 118 is a photographic camera configured to acquire digital photographic images of the ground path(s) 102 at a predetermined rate, such as frames per second.

The housing 124 includes a mounting assembly that is disposed on or proximate to (such as within 3 feet or less of an edge of) the ground path(s) 102. For example, the housing 124 is sized and shaped as a runway edge lighting device. In at least one example, the housing 124 is sized and shaped to have a height between 14-30 inches. In this manner, the housing 124 complies with one or more regulations for a size of runway edge lighting devices promulgated by one or more regulatory authorities (such as the United States Federal Aviation Administration). Optionally, the housing 124 can be sized and shaped differently than runway edge lighting. The housing 124 retains the imaging device 118 so that at least a portion of the ground path(s) 102 and final approach path of landing aircraft is within a field of view of the imaging device 118.

In at least one example, the communication device 122 is an antenna, a transceiver, or the like. The communication device 122 is configured to allow the control unit 120 to wirelessly communicate with the aircraft 104 and/or the air traffic control 110.

In at least one example, the control unit 120 is or otherwise includes one or more microprocessors or one or more microcontrollers. As a non-limiting example, the control unit 120 can include a 64 bit, 2.4 GHz processor. In this manner, the control unit 120 provides a low cost, lightweight computing device. The control unit 120 is configured to receive images acquired by the imaging device 118, and use computer vision techniques to detect objects therein, and motion of the objects. The control unit 120 is not configured to utilize deep learning, machine learning, or artificial intelligence to analyze the images. Instead, by using computer vision techniques to analyze the images, the control unit 120 can be a simpler, smaller, lighter and/or less costly computing device that consumes substantially less power to operate (as compared to systems that use deep learning, machine leaning, and/or artificial intelligence). As such, the system 100 provides an efficient and cost-effective solution for various smaller airports, airfields, airstrips, vertiports, austere landing areas, seaplane bases, waterplane bases (e.g., waterdomes), or the like which might not have infrastructure and resources for sophisticated and high cost monitoring operations as are commonplace at larger airports. Alternatively, the control unit 120 can be configured to utilize deep learning, machine learning, or artificial intelligence to the analyze the images.

In operation, the imaging device 118 acquires images, such as video images, of the ground path(s) 102. The images can include at least a portion of a final approach path(s) in a field of view. That is, an image of a ground path 102 includes areas above the ground path 102, which includes at least a portion of a final approach path. The control unit 120 receives the images from the imaging device 118. The control unit 120 uses computer vision to detect objects, such as the aircraft 104, the objects 106, the ground vehicles 108, and/or the like within the images. With respect to the objects, the control unit 120 can disregard objects that are smaller than a predetermined size. For example, a small bird can have a size that is less than a predetermined size threshold, and can be disregarded by the control unit 120. As another example, a larger bird having a size greater than the predetermined size threshold can be monitored by the control unit 120. As another example, a flock of birds can provide a combined moving object that is above the size threshold, and the control unit 120 can therefore monitor the flock of birds. As another example, an aircraft within the field of view of the imaging device 118 that is over 10 miles away can be below the size threshold. However, as the aircraft moves closer, such as within 5 miles, the size of the aircraft within acquired images increases to exceed the size threshold. As such, the control unit 120 monitors the object(s) that meet(s) or exceed(s) the size threshold.

The control unit 120 then detects if the objects are moving. For example, an aircraft 104 can be moving toward or away from the ground path(s) 102 and/or a final approach path. The control unit 120 then determines a distance (such as a separation path) between the moving objects, such as between an aircraft 104, another aircraft 104, an object 106, or a ground vehicle 108. The control unit 120 provides an alert to an aircraft 104 as a monitored object, such as another aircraft 104, is moving toward the aircraft 104 at a predetermined rate. For example, if the distance between the aircraft 104 and another object, such as another aircraft 104, is at least a predetermined distance (such as within 2000 feet or less), and decreases at a predetermined rate, the control unit 120 outputs an alert signal via the communication device 122 to the aircraft 104 and/or the air traffic control 110. The alert signal or signals can be shown on a display of a user interface, such as the display 114 of the user interface 112, and/or broadcast through a speaker within the flight deck or cockpit of the aircraft 104. As another example, the alert signal(s) can be output as one or more tactile signals, such as vibrations of controls, seats, or the like, in addition to or in lieu of one or both visual- and audio-based signals. The alert provided by the alert signal informs a pilot of the aircraft 104 to be aware of the other object (such as the other aircraft) in relation to the ground path(s) 102. Conversely, if the distance between the aircraft 104 and the other moving object, such as the other aircraft, is at least a predetermined distance (such as at least 1000 feet apart), and the distance continues to increase, the control unit 120 may refrain from outputting the alert signal.

In at least one example, the air traffic control 110 includes the user interface 112, which is in communication with the control unit 120. In this example, the air traffic control 110 receives information from the control unit 120, and communicates such information to one or more pilots of the aircraft 104.

As described, the imaging device 118 acquires images of the ground path(s) 102 including objects on or proximate to (such as within the field of view of the imaging device 118) the ground path(s) 102, including at least a portion of a final approach path in the field of view. The control unit 120 receives the images from the imaging device 118, and detects the objects within the images. The control unit 120 can localize the objects, such as by using computer vision techniques to provide a boundary around the objects. If the objects meet or exceed a predetermined size threshold, the control unit 120 monitors the objects. If, however, the objects are smaller than the predetermined size threshold, the control unit 120 can disregard the objects. After detecting the objects within the images, the control unit 120 then tracks motion of the objects. The control unit 120 can further highlight relative motion between different objects (such as an aircraft 104 and another aircraft 104) by inserting a line therebetween. The control unit 120 then monitors the highlighting, such as the line, to determine if the objects are moving toward or away from one another. If the objects are moving toward each other, the control unit 120 then outputs an alert signal (for example, a visual signal, an aural signal, and/or a tactile signal) to one or more of the aircraft 104 indicating the presence of a moving object in relation to the aircraft 104.

In at least one example, the control unit 120 can be configured to predict trajectories of moving objects, such as through Kalman filtering. The control unit 120 can output data, such as alert signals, to the aircraft 104 and/or the air traffic control 110, through wireless networking, for example.

As noted, the system 100 is simple, relatively small and light-weight, and does not utilize more sophisticated technology such as machine learning, deep learning, or artificial intelligence, thereby substantially reducing computational expense and power consumption. In at least one example, the control unit 120 can be or otherwise include a simple microcontroller that is cost-effective, and an easy to implement at an airfield level. The system 100 can be used on its own to monitor the ground path(s) 102, or optionally augment existing monitoring systems at airports.

As described, the system 100 is configured to monitor one or more ground paths on which one or more aircraft are configured to move. The system 100 includes the imaging device 118 configured to acquire one or more images of the ground path(s) 102. The control unit 120 is in communication with the imaging device 118. The control unit 120 is configured to receive the image(s) from the imaging device 118, detect one or more objects (such as aircraft 104, objects 106, ground vehicles 108, etc.) within the image(s), track motion of the object(s), and output an alert to an aircraft 104 in response to the object(s) moving in relation to (for example, toward) the aircraft 104 (such as within a predetermined distance and at a predetermined rate).

Figure 2:
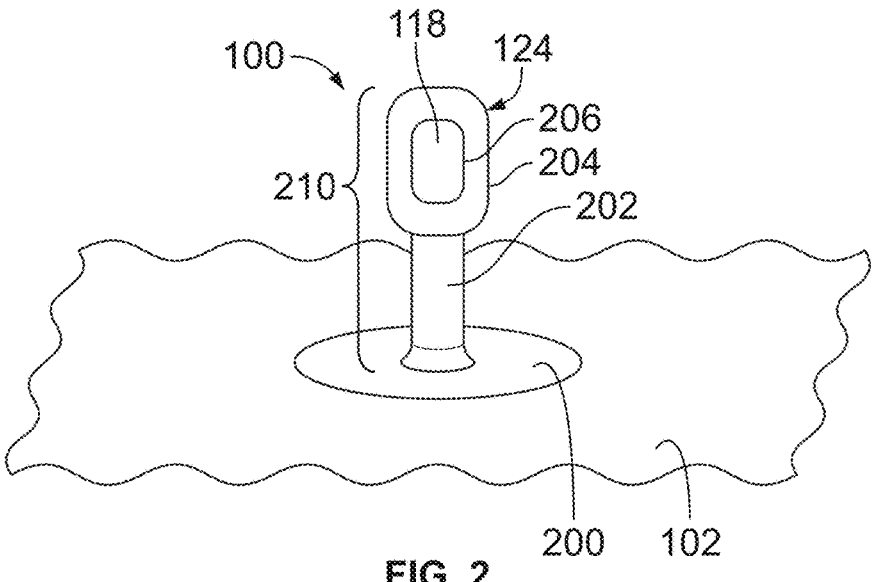
FIG. 2 illustrates a perspective front view of the system, according to an example of the present disclosure.

FIG. 2 illustrates a perspective front view of the system 100, according to an example of the present disclosure. In at least one example, the system 100 is mounted in relation to a ground path 102. For example, the system 100 can be mounted at an end of the ground path 102. As another example, the system 100 can be mounted on a side of the ground path 102. As another example, the system 100 can be spaced apart from the ground path 102, such as within 5 feet of an edge of the runway 102.

In at least one example, the housing 124 of the system 100 is sized and shaped as a runway edge lighting device. For example, the housing 124 includes a base 200 secured to ground, such as a portion of the ground path 102. A column 202 upwardly extends from the base 200. A head 204 connects to the column 202 opposite from the base 200. Referring to FIGS. 1 and 2, the head 204 contains the imaging device 118, the control unit 120, and the communication device 122. The head 204 includes an aperture 206 through which the imaging device 118 can acquire images.

The housing 124 is sized and shaped to comply with regulations for runway edge lighting, such as promulgated by the United States Federal Aviation Administration. For example, a height 210 of the housing 124 can be between 14-30 inches off the ground. In this manner, the system 100 complies with regulated size and shape requirements for an object on or proximate to a runway.

Optionally, the housing 124 can be sized and shaped differently than shown. For example, the housing 124 might not include a column. As another example, the head 204 can be mounted directly to the ground. As another example, the housing 124 might not be sized and shaped as a runway edge lighting device.

Figure 3:
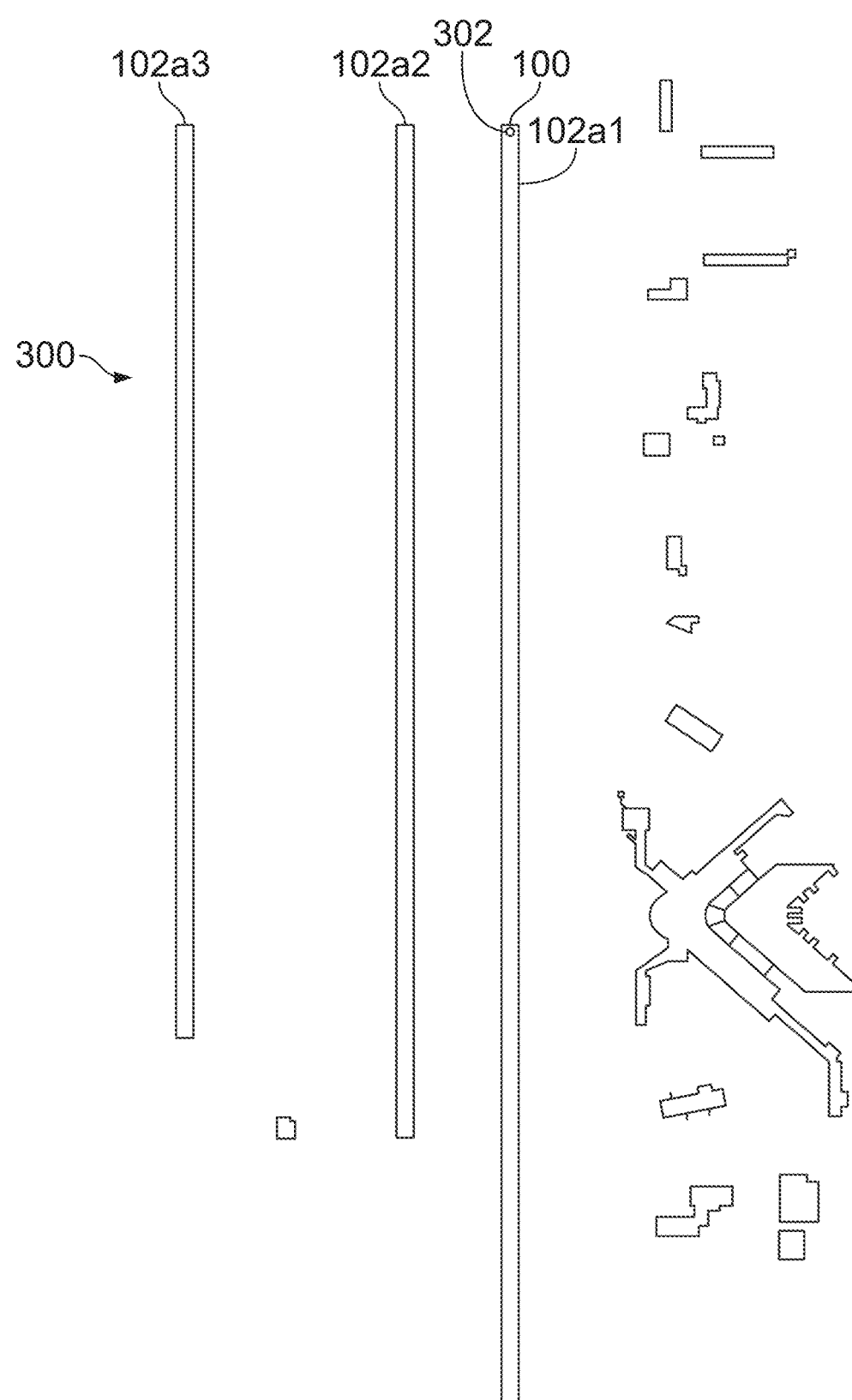
FIG. 3 illustrates a top view of an airport, according to an example of the present disclosure.

FIG. 3 illustrates a top view of an airport 300, according to an example of the present disclosure. The airport 300 includes runways 102a1, 102a2, and 102a3. The system 100 is disposed on the runway 102a1, such as at an end 302 of the runway 102a1. The airport 300 shown in FIG. 3 is an example of an airport. Further, the location of the system 100 in FIG. 3 is merely an example, as are the number of ground areas, which can be greater or fewer than what is shown. The system 100 can be disposed at various other locations, including airfields, airstrips, vertiports, or austere takeoff/landing environments. It is also possible for technology described herein to be utilized for similar purposes in an environment not pertaining to aircraft, but rather to other vehicle, such as ground-, sea-, or spaced-based vehicles.

Figure 4:
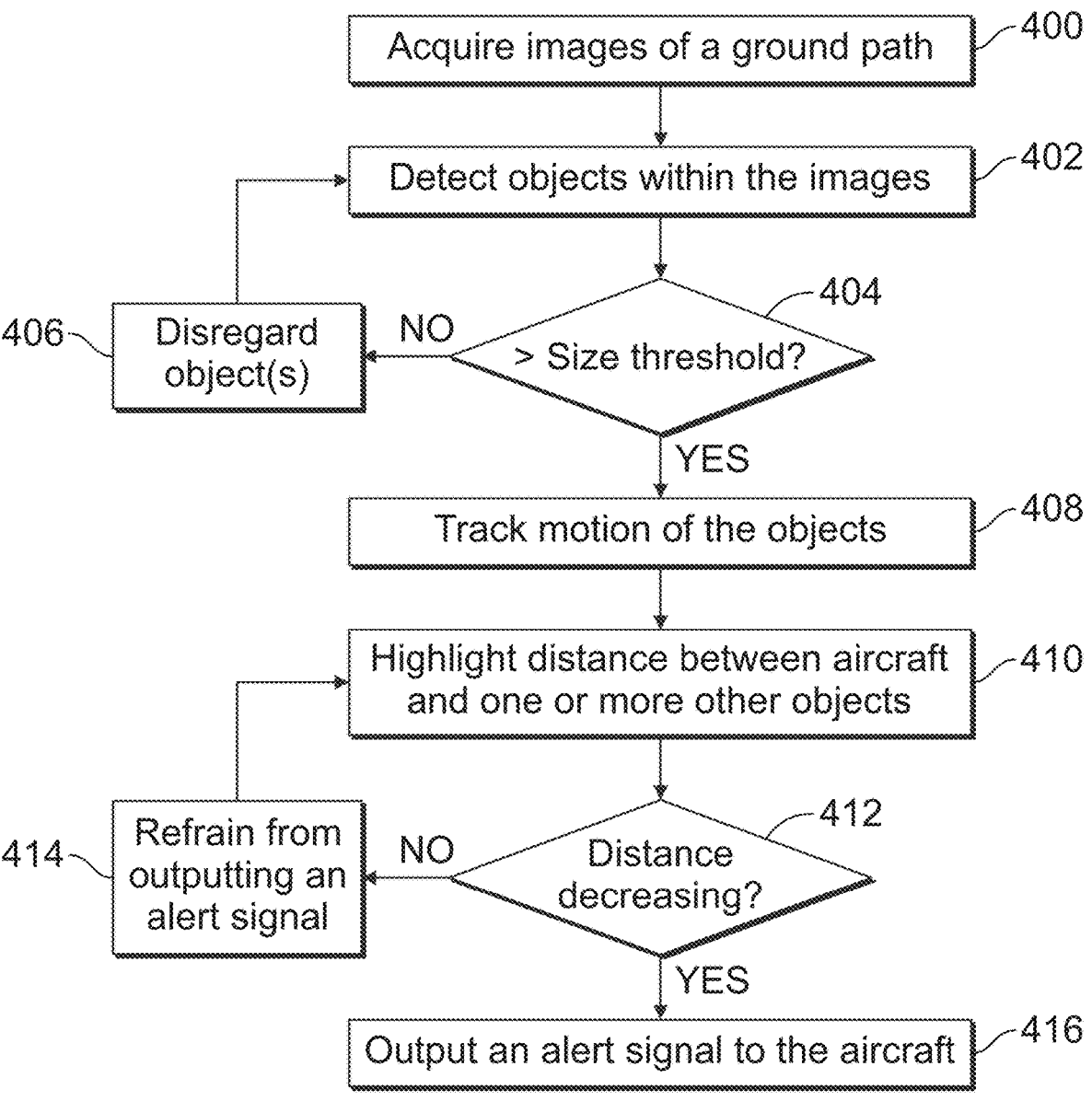
FIG. 4 illustrates a flow chart of a method, according to an example of the present disclosure.

FIG. 4 illustrates a flow chart of a method, according to an example of the present disclosure. Referring to FIGS. 1 and 4, at 400, the imaging device 118 acquires images of the ground path(s) 102. The images include the ground path(s) 102 and spaces surrounding the ground path(s) 102, such as within a field of view of the imaging device 118. In at least one example, the images are video images.

At 402, the control unit 120 receives the images, and detects objects within the images. The control unit 120 utilizes computer vision techniques to detect the objects. Examples of the objects include stationary structures (such as gates, hangars, terminals, and the like) and moving structures (such as the aircraft 104, ground vehicles 108, or, although not depicted, humans, animals, and/or other wild-life, and the like). At 404, the control unit 120 compares the objects with a predetermined size threshold to determine if the objects are greater than the size threshold. If not, the method proceeds to 406, at which the control unit 120 disregards the object(s).

If, however, the objects detected within the images are greater than the predetermined size threshold at 404, the method proceeds to 408, at which the control unit 120 tracks motion of the objects relative to one another. At 410, the control unit 120 highlights a distance between an aircraft 104 and one or more other objects. At 412, the control unit 120 determines if the highlighted distance is decreasing. If not, the method proceeds to 414, at which the control unit 120 refrains from outputting an alert signal. The method then returns to 410.

If, however, the highlighted distance is decreasing at 412, the method proceeds to 416, at which the control unit 120 outputs an alert signal to the aircraft 104. The alert signal can be shown as a text, graphic, or video message on the display 114 of the user interface 112 of the aircraft 104, and/or broadcast as an audio message through a speaker within a flight deck or cockpit of the aircraft 104, and/or as a tactile-based signal, such as a vibration at the seat of one or more of the pilots. The alert signal or signals serve to inform the pilot of the aircraft 104 of other moving objects within the vicinity (such as within a predetermined distance, for example, 5000 feet or less) of the aircraft 104.

Figure 5:
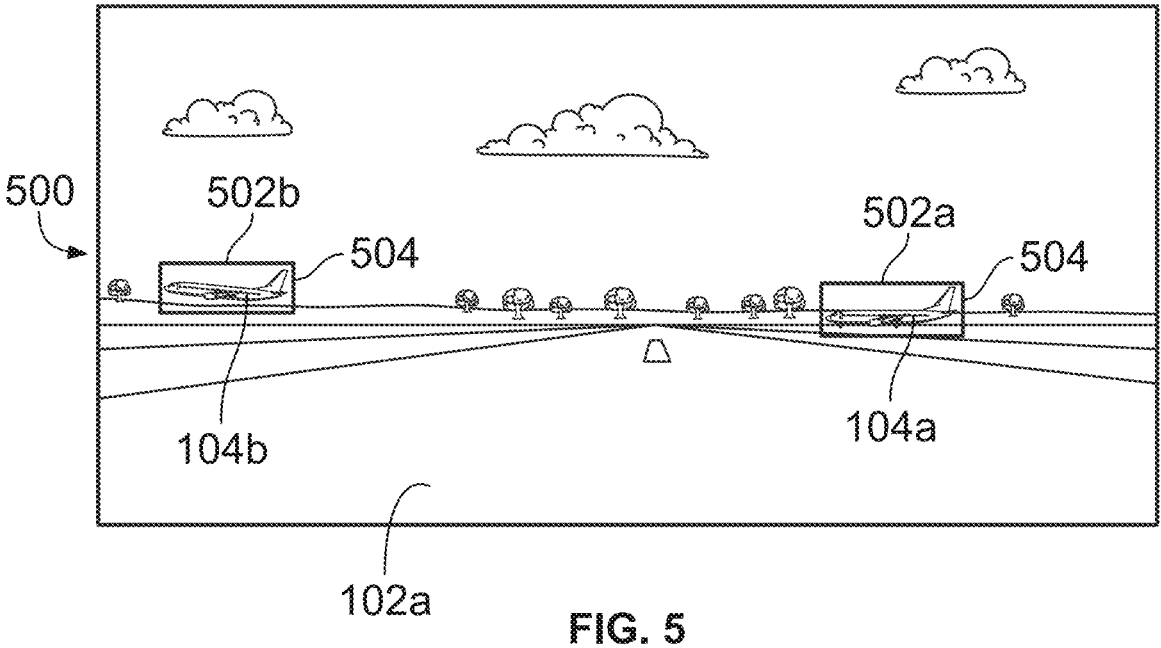
FIG. 5 illustrates an image of a runway, according to an example of the present disclosure.

FIG. 5 illustrates an image 500 of a ground path 102, which, according to an example of the present disclosure, is a runway 102a. Referring to FIGS. 1 and 5, the image 500 is a video image acquired by the imaging device 118. The control unit 120 receives the image 500 from the imaging device 118. The control unit 120 detects a first moving object 502a and a second moving object 502b within the image 500. The first moving object 502a is a first aircraft 104a taxiing toward the runway 102a, and the second moving object 502b is a second aircraft 104b landing on another runway proximate to the runway 102a. The control unit 120 can insert boundaries 504 (such as a virtual box, circle, or the like) around the moving objects 502a and 502b.

Figure 6:
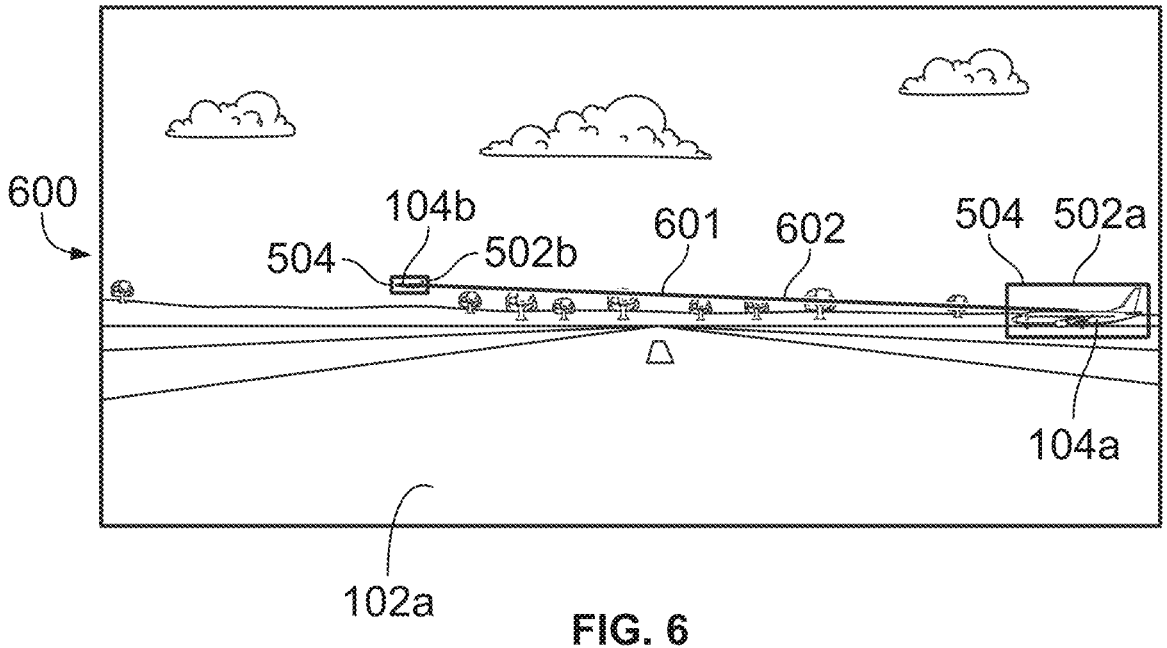
FIG. 6 illustrates an image of a runway, according to an example of the present disclosure.

FIG. 6 illustrates an image 600 of a ground path 102, which, according to an example of the present disclosure, is a runway 102a. Referring to FIGS. 1, 5, and 6, the control unit 120 highlights a distance 601 between the first moving object 502a and the second moving object 502b. In at least one example, the control unit 120 highlights the distance 601 by providing a line 602 extending between centers of the two boundaries 504 surrounding the respective moving objects 502a and 502b. The control unit 120 continually monitors the distance 601 when the moving objects 502 and 502b are contained within the image 600. If the distance 601 decreases over time, the control unit 120 outputs the alert signal, such as both the first aircraft 104a and the second aircraft 104b.

Figure 7:
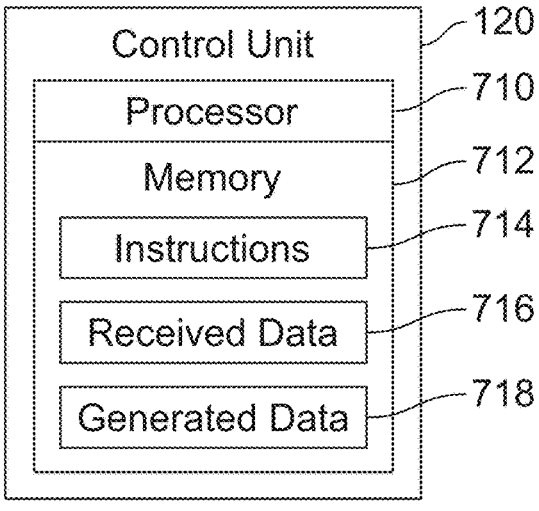
FIG. 7 illustrates a schematic block diagram of a control unit, according to an example of the present disclosure.

FIG. 7 illustrates a schematic block diagram of the control unit 120, according to an example of the present disclosure. In at least one example, the control unit 120 includes at least one processor 710 in communication with a memory 712. The memory 712 stores instructions 714, received data 716, and generated data 718. The control unit 120 shown in FIG. 7 is merely exemplary, and non-limiting.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 120 may be or include one or more processors that are configured to control operation, as described herein.

The control unit 120 is configured to execute a set of instructions that are stored in one or more data storage units or elements (such as one or more memories), in order to process data. For example, the control unit 120 may include or be coupled to one or more memories. The data storage units may also store data or other information as desired or needed. The data storage units may be in the form of an information source or a physical memory element within a processing machine.

The set of instructions may include various commands that instruct the control unit 120 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 120. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 120 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 8:
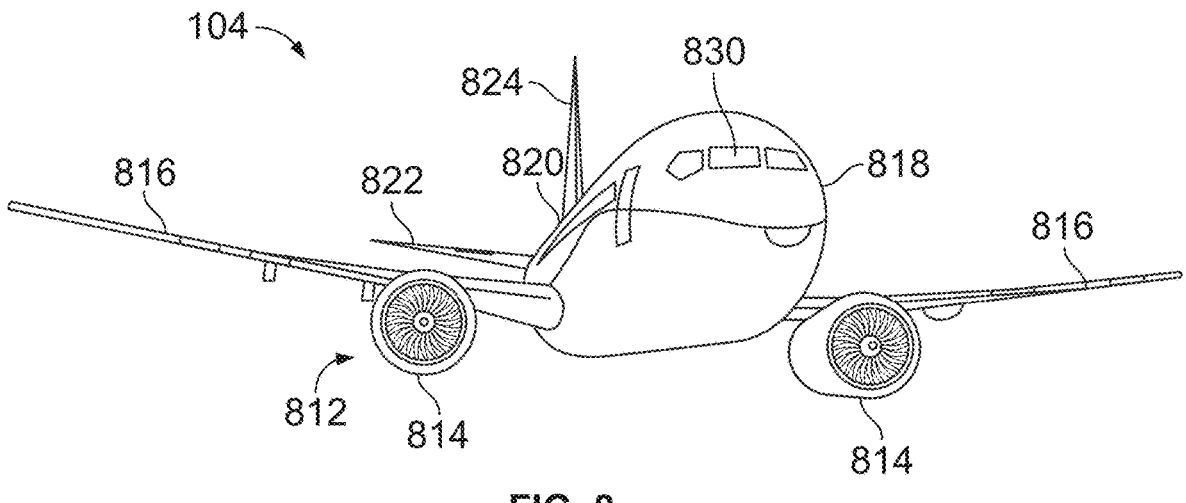
FIG. 8 illustrates a perspective front view of an aircraft, according to an example of the present disclosure.

FIG. 8 illustrates a perspective front view of an aircraft 104, according to an example of the present disclosure. The aircraft 104 includes a propulsion system 812 that includes engines 814, for example. Optionally, the propulsion system 812 may include more engines 814 than shown. The engines 814 are carried by wings 816 of the aircraft 104. In other examples, the engines 814 may be carried by a fuselage 818 and/or an empennage 820. The empennage 820 may also support horizontal stabilizers 822 and a vertical stabilizer 824. The fuselage 818 of the aircraft 104 defines an internal cabin 830, which includes a flight deck or cockpit, one or more work sections (for example, galleys, personnel carry-on baggage areas, and the like), one or more passenger sections (for example, first class, business class, and coach sections), one or more lavatories, and/or the like. FIG. 8 shows an example of an aircraft 104. It is to be understood that the aircraft 104 can be sized, shaped, and configured differently than shown in FIG. 8.

Further, the disclosure comprises examples according to the following clauses:

Clause 1. A system for monitoring one or more ground paths, the system comprising:

an imaging device configured to acquire one or more images of the one or more ground paths; and a control unit in communication with the imaging device, wherein the control unit is configured to:

receive the one or more images from the imaging device, detect one or more objects within the one or more images, track motion of the one or more objects within the one or more images, and output an alert signal to one or more vehicles in response to the one or more objects moving in relation to the one or more vehicles.

Clause 2. The system of Clause 1, wherein the control unit is configured to use computer vision to detect the one or more objects, and track the motion of the one or more objects.

Clause 3. The system of Clauses 1 or 2, wherein the control unit does not use deep learning, machine learning, or artificial intelligence.

Clause 4. The system of any of Clauses 1-3, wherein the one or more objects comprise one or more of another aircraft, a ground vehicle, a human, or wildlife.

Clause 5. The system of any of Clauses 1-4, wherein the imaging device comprises one or more video cameras, and wherein the one or more images are one or more video images.

Clause 6. The system of any of Clauses 1-5, wherein the control unit is configured to output the alert signal to a user interface of the aircraft.

Clause 7. The system of Clause 6, wherein the alert signal is configured to be one or more of shown on the display of the user interface, broadcast as an audio message, or generated as a tactile response.

Clause 8. The system of any of Clauses 1-7, further comprising a housing that contains the imaging device and the control unit.

Clause 9. The system of Clause 8, wherein the housing is configured to be disposed on or proximate to the one or more ground paths.

Clause 10. The system of Clauses 8 or 9, wherein the housing is sized and shaped as a runway edge lighting device.

Clause 11. The system of any of Clauses 1-10, wherein the control unit is further configured to insert one or more boundaries around the one or more objects within the one or more images.

Clause 12. The system of any of Clauses 1-11, wherein the control unit is further configured to highlight a distance between the aircraft and the one or more objects within the one or more images.

Clause 13. A method for a system for monitoring one or more ground paths, the system comprising:

an imaging device configured to acquire one or more images of the one or more ground paths; and a control unit in communication with the imaging device, wherein the control unit is configured to:

receive the one or more images from the imaging device, detect one or more objects within the one or more images, track motion of the one or more objects, and output an alert signal to an aircraft in response to the one or more objects moving in relation to the aircraft, the method comprising:

receiving, by the control unit, the one or more images from the imaging device;

detecting, by the control unit, the one or more objects within the one or more images;

tracking, by the control unit, the motion of the one or more objects within the one or more images; and outputting, by the control unit, the alert signal to the aircraft in response to the one or more objects moving in relation to the aircraft.

Clause 14. The method of Clause 13, wherein said detecting and tracking comprises using computer vision, and wherein said detecting and tracking do not include using deep learning, machine learning, or artificial intelligence.

Clause 15. The method of Clauses 13 or 14, wherein the one or more objects comprise one or more of another aircraft, a ground vehicle, a human, or wildlife.

Clause 16. The method of any of Clauses 13-15, wherein the imaging device comprises one or more video cameras, and wherein the one or more images are one or more video images.

Clause 17. The method of any of Clauses 13-16, wherein said outputting comprises outputting the alert signal to a user interface of the aircraft, and wherein the method further comprises one or more of showing the alert signal on the display of the user interface, broadcasting the alert signal as an audio message, or generating the alert signal as a tactile response.

Clause 18. The method of any of Clauses 13-17, wherein the system further comprises a housing that contains the imaging device and the control unit, wherein the housing is configured to be disposed on or proximate to the one or more ground paths, and wherein the housing is sized and shaped as a runway edge lighting device.

Clause 19. The method of any of Clauses 13-18, further comprising: inserting, by the control unit, one or more boundaries around the one or more objects within the one or more images; and highlighting, by the control unit, a distance between the aircraft and the one or more objects within the one or more images.

Clause 20. A system for monitoring one or more ground paths, the system comprising:

a housing configured to be disposed on or proximate to the one or more ground paths, wherein the housing is sized and shaped as a runway edge lighting device;

an imaging device retained within the housing, the imaging configured to acquire one or more images of the one or more ground paths, wherein the imaging device comprises one or more video cameras, and wherein the one or more images are one or more video images;

a control unit retained within the housing, the control unit in communication with the imaging device, wherein the control unit is configured to:

receive the one or more images from the imaging device, detect, by computer vision, one or more objects within the one or more images, wherein the one or more objects comprise one or more of another aircraft, a ground vehicle, or wildlife, insert one or more boundaries around the one or more objects within the one or more images, highlight a distance between an aircraft and the one or more objects within the one or more images, track, by computer vision, motion of the one or more objects within the one or more images, and output an alert signal to the aircraft in response to the one or more objects moving in relation to the aircraft, wherein the alert signal is configured to be one or both of shown on a display of a user interface, or broadcast as an audio message wherein the control unit does not use deep learning, machine learning, or artificial intelligence.

As described herein, examples of the present disclosure provide efficient and effective systems and methods for monitoring ground paths, such as runways at airports. Further, examples of the present disclosure provide cost-effective and simplified systems and methods for monitoring ground paths.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
a housing that contains an imaging device configured to acquire one or more images of one or more ground paths, wherein the housing is sized and shaped as a runway edge lighting device; and
a control unit in communication with the imaging device, wherein the control unit is configured to:
receive the one or more images from the imaging device,
detect one or more objects within the one or more images,
track motion of the one or more objects within the one or more images, and
output an alert signal to one or more vehicles in response to the one or more objects moving in relation to the one or more vehicles.

2. The system of claim 1, wherein the one or more images of the one or more ground paths include at least a portion of a final approach path for an aircraft.

3. The system of claim 1, wherein the control unit is configured to use computer vision to detect the one or more objects, and track the motion of the one or more objects.

4. The system of claim 1, wherein the control unit does not use deep learning, machine learning, or artificial intelligence.

5. The system of claim 1, wherein the one or more objects comprise one or more of another aircraft, a ground vehicle, a human, or wildlife.

6. The system of claim 1, wherein the imaging device comprises one or more video cameras, and wherein the one or more images are one or more video images.

7. The system of claim 1, wherein the control unit is configured to output the alert signal to a user interface of the one or more vehicles.

8. The system of claim 7, wherein the alert signal is configured to be one or more of shown on a display of the user interface, broadcast as an audio message, or generated as a tactile response.

9. The system of claim 1, wherein the housing also contains the control unit.

10. The system of claim 1, wherein the housing is configured to be disposed on or proximate to the one or more ground paths.

11. The system of claim 1, wherein the control unit is further configured to insert one or more boundaries around the one or more objects within the one or more images.

12. The system of claim 1, wherein the control unit is further configured to highlight a distance between the one or more vehicles and the one or more objects within the one or more images, and wherein the control unit is configured to highlight the distance by inserting and showing, on a display, one or more lines between the one or more vehicles and the one or more objects.

13. A method for a system, the comprising:
a housing that contains an imaging device configured to acquire one or more images of the one or more ground paths, wherein the housing is sized and shaped as a runway edge lighting device; and
a control unit in communication with the imaging device, wherein the control unit is configured to:
receive the one or more images from the imaging device,
detect one or more objects within the one or more images,
track motion of the one or more objects, and
output an alert signal to one or more vehicles in response to the one or more objects moving in relation to the one or more vehicles,
the method comprising:
receiving, by the control unit, the one or more images from the imaging device;
detecting, by the control unit, the one or more objects within the one or more images;
tracking, by the control unit, the motion of the one or more objects within the one or more images; and
outputting, by the control unit, the alert signal to the one or more vehicles in response to the one or more objects moving in relation to the one or more vehicles.

14. The method of claim 13, wherein said detecting and tracking comprises using computer vision, and wherein said detecting and tracking do not include using deep learning, machine learning, or artificial intelligence.

15. The method of claim 13, wherein the one or more objects comprise one or more of another aircraft, a ground vehicle, a human, or wildlife.

16. The method of claim 13, wherein the imaging device comprises one or more video cameras, and wherein the one or more images are one or more video images.

17. The method of claim 13, wherein said outputting comprises outputting the alert signal to a user interface of the one or more vehicles, and wherein the method further comprises one or more of showing the alert signal on a display of the user interface, broadcasting the alert signal as an audio message, or generating the alert signal as a tactile response.

18. The method of claim 13, wherein the housing also contains the control unit, and wherein the housing is disposed on or proximate to the one or more ground paths.

19. The method of claim 13, further comprising:
inserting, by the control unit, one or more boundaries around the one or more objects within the one or more images; and
highlighting, by the control unit, a distance between the one or more vehicles and the one or more objects within the one or more images, wherein said highlighting comprises inserting and showing, on a display, one or more lines between the one or more vehicles and the one or more objects.

20. A system comprising:
a housing configured to be disposed on or proximate to one or more ground paths, wherein the one or more images of the one or more ground paths include at least a portion of a final approach path for an aircraft, wherein the housing is sized and shaped as a runway edge lighting device;

an imaging device retained within the housing, the imaging configured to acquire one or more images of the one or more ground paths, wherein the imaging device comprises one or more video cameras, and wherein the one or more images are one or more video images; and a control unit retained within the housing, the control unit in communication with the imaging device, wherein the control unit is configured to:

receive the one or more images from the imaging device, detect, by computer vision, one or more objects within the one or more images, wherein the one or more objects comprise one or more of another aircraft, a ground vehicle, or wildlife, insert one or more boundaries around the one or more objects within the one or more images, highlight a distance between an aircraft and the one or more objects within the one or more images, track, by computer vision, motion of the one or more objects within the one or more images, and output an alert signal to the aircraft in response to the one or more objects moving in relation to the aircraft, wherein the alert signal is configured to be one or both of shown on a display of a user interface, or broadcast as an audio message, wherein the control unit does not use deep learning, machine learning, or artificial intelligence.

21. The system of claim 1, wherein the one or more ground paths comprise a runway, wherein the housing complies with regulations for runway edge lighting promulgated by one or more regulatory authorities, wherein the housing is mounted at an end of one of the runway, and wherein the housing comprises:

a base secured to a portion of the end of the runway;

a column upwardly extending from base; and a head connected to the column opposite from the base, wherein the head includes an aperture through which the image device acquired the one or more images.

* * * * *